United States Patent
Arima et al.

(10) Patent No.: US 12,168,436 B2
(45) Date of Patent: Dec. 17, 2024

(54) VEHICLE MOTION CONTROL APPARATUS, VEHICLE MOTION CONTROL METHOD, AND VEHICLE MOTION CONTROL SYSTEM

(71) Applicant: Hitachi Astemo, Ltd., Hitachinaka (JP)

(72) Inventors: Hidetoshi Arima, Hitachinaka (JP); Satoshi Kashiwamura, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 217 days.

(21) Appl. No.: 17/788,790

(22) PCT Filed: Dec. 21, 2020

(86) PCT No.: PCT/JP2020/047634
§ 371 (c)(1),
(2) Date: Jun. 24, 2022

(87) PCT Pub. No.: WO2021/132134
PCT Pub. Date: Jul. 1, 2021

(65) Prior Publication Data
US 2023/0026238 A1    Jan. 26, 2023

(30) Foreign Application Priority Data
Dec. 25, 2019   (JP) .................................. 2019-234314

(51) Int. Cl.
*B60W 30/02* (2012.01)
*B60W 10/18* (2012.01)
(Continued)

(52) U.S. Cl.
CPC ............ *B60W 30/02* (2013.01); *B60W 10/18* (2013.01); *B60W 10/20* (2013.01);
(Continued)

(58) Field of Classification Search
None
See application file for complete search history.

(56) References Cited

U.S. PATENT DOCUMENTS

| | | | |
|---|---|---|---|
| 2016/0152237 A1* | 6/2016 | Takahashi | B60W 30/12 701/41 |
| 2018/0178838 A1 | 6/2018 | Inoue et al. | |

(Continued)

FOREIGN PATENT DOCUMENTS

| | | |
|---|---|---|
| JP | 2014-108654 A | 6/2014 |
| JP | 2017-30390 A | 2/2017 |

(Continued)

OTHER PUBLICATIONS

Japanese-language Office Action issued in Japanese Application No. 2021-567430 dated Sep. 12, 2023 with English translation (11 pages).

(Continued)

*Primary Examiner* — Hongye Liang
(74) *Attorney, Agent, or Firm* — Crowell & Moring LLP

(57) ABSTRACT

A vehicle motion control apparatus includes a control unit which controls a steering apparatus and a brake apparatus provided in a vehicle. The control unit acquires a normative motion state amount necessary for the vehicle to trace a target traveling path, acquires a target motion state amount necessary for generating a yaw moment to cancel unstable behavior of the vehicle, and acquires a target steering angle for generating a steering angle moment and a target brake force for generating a brake moment, to obtain a necessary yaw moment generated by the vehicle. The control unit outputs a first control command for obtaining the target steering angle to the steering apparatus and outputs a second control command for obtaining the target brake force to the brake apparatus.

11 Claims, 14 Drawing Sheets

(51) Int. Cl.
    *B60W 10/20*     (2006.01)
    *B60W 60/00*     (2020.01)

(52) U.S. Cl.
    CPC .... *B60W 60/0053* (2020.02); *B60W 60/0059* (2020.02); *B60W 2520/00* (2013.01)

(56) References Cited

U.S. PATENT DOCUMENTS

| | | |
|---|---|---|
| 2019/0155279 A1 | 5/2019 | Tayama |
| 2021/0245757 A1 | 8/2021 | Imamura et al. |

FOREIGN PATENT DOCUMENTS

| | | | |
|---|---|---|---|
| JP | 2018-103732 A | 7/2018 | |
| JP | 2019-55643 A | 4/2019 | |
| JP | 2019-214304 A | 12/2019 | |

OTHER PUBLICATIONS

International Preliminary Report on Patentability (PCT/IB/338 & PCT/IB/373) issued in PCT Application No. PCT/JP2020/047634 dated Jul. 7, 2022, including English translation of document C2 (Japanese-language Written Opinion (PCT/ISA/237) filed on Jun. 24, 2022) (12 pages).

International Search Report (PCT/ISA/210) issued in PCT Application No. PCT/JP2020/047634 dated Feb. 2, 2021 with English translation (six (6) pages).

Japanese-language Written Opinion (PCT/ISA/237) issued in PCT Application No. PCT/JP2020/047634 dated Feb. 2, 2021 (five (5) pages).

Japanese-language Office Action issued in Japanese Application No. 17/788,790 dated Sep. 12, 2023 with English translation (11 pages).

Extended European Search Report issued in European Application No. 20905312.3 dated Apr. 24, 2023 (10 pages).

\* cited by examiner

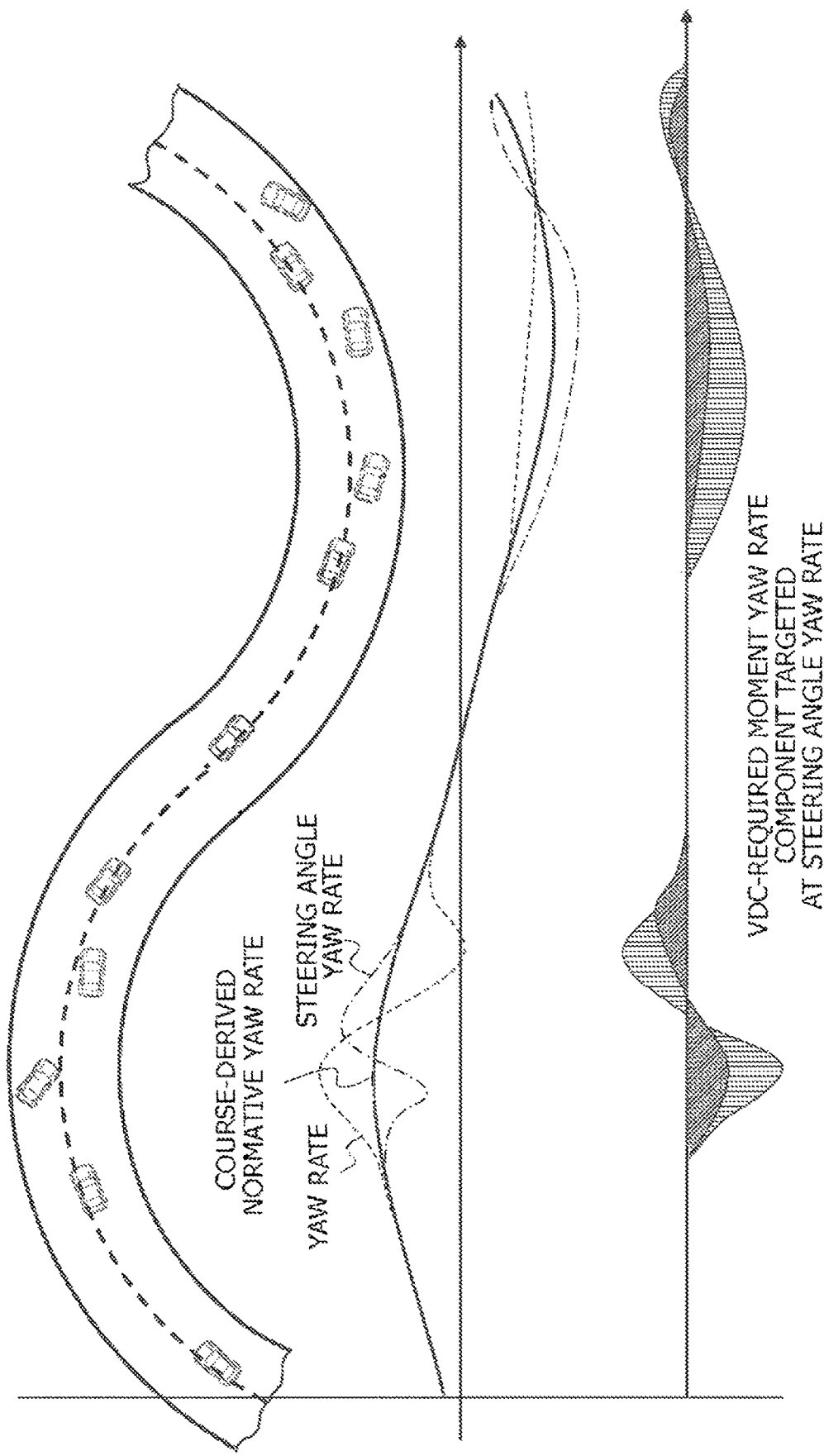

VEHICLE MOTION CONTROL APPARATUS, VEHICLE MOTION CONTROL METHOD, AND VEHICLE MOTION CONTROL SYSTEM

TECHNICAL FIELD

The present invention relates to a vehicle motion control apparatus, to a vehicle motion control method, and to a vehicle motion control system.

BACKGROUND ART

Various vehicle motion control apparatuses have conventionally been provided and are known, including one disclosed in Patent Document 1, for example. The apparatus disclosed in Patent Document 1 performs automated (autonomous) driving control including target steering angle calculation processing for calculating a target steering angle for wheels and performs steering control for steering the wheels by operating an electric power steering apparatus such that the steering angle for the wheels reaches the target steering angle.

In the target steering angle calculation processing, the above apparatus performs a first processing for calculating an automated-driving steering angle and a target state amount required for automated steering during automated driving, a second processing for calculating a counter-steering angle required for vehicle stabilization control based on the target state amount without using a steering wheel angle, and a third processing for calculating a sum of the automated driving steering angle and the counter-steering angle as the target steering angle. In this way, the apparatus performs automated driving control into which vehicle stabilization control suitable for automated driving is included.

REFERENCE DOCUMENT LIST

Patent Document

Patent Document 1: JP2018-103732A

SUMMARY OF THE INVENTION

Problem to be Solved by the Invention

In the above Patent Document 1, when generating a counter-yaw moment to cancel unstable behavior, the vehicle stabilization control suitable for automated (autonomous) driving takes into account only a counter-yaw moment based on the steering wheel, i.e., a counter-yaw moment based on steering. However, if such a yaw moment is generated based on steering, lateral force is also generated, and both course traceability and behavior stability may not be achieved.

The present invention has been made in view of the above circumstances, and it is an object of the present invention to provide a vehicle motion control apparatus, a vehicle motion control method, and a vehicle motion control system that can achieve both course traceability and behavior stability in automated (autonomous) driving.

Means for Solving the Problem

A vehicle motion control apparatus according to the present invention is, in one aspect thereof, a vehicle motion control apparatus including a control unit which controls a steering apparatus and a brake apparatus that are provided in a vehicle, wherein the control unit acquires, based on information about a target traveling path on which the vehicle travels, the information having been acquired by an external information acquisition unit, a normative motion state amount necessary for the vehicle to trace the target traveling path, acquires a target motion state amount necessary for generating a yaw moment to cancel unstable behavior of the vehicle, based on the normative motion state amount and a motion state amount of the vehicle acquired from a vehicle motion state detection unit mounted in the vehicle, acquires a target steering angle for generating a steering angle moment and a target brake force for generating a brake moment, to obtain a necessary yaw moment generated by the vehicle, based on the information about the target traveling path and the target motion state amount, outputs a first control command for obtaining the target steering angle to the steering apparatus, and outputs a second control command for obtaining the target brake force to the brake apparatus.

In addition, a vehicle motion control method according to the present invention is, in one aspect thereof, a vehicle motion control method for obtaining control commands for controlling a steering apparatus and a brake apparatus that are provided in a vehicle, the vehicle motion control method including: acquiring, based on information about a target traveling path on which the vehicle travels, the information having been acquired by an external information acquisition unit, a normative motion state amount necessary for the vehicle to trace the target traveling path; acquiring a target motion state amount necessary for generating a yaw moment to cancel unstable behavior of the vehicle, based on the normative motion state amount and a motion state amount of the vehicle acquired from a vehicle motion state detection unit mounted in the vehicle; acquiring a target steering angle for generating a steering angle moment and a target brake force for generating a brake moment, to obtain a necessary yaw moment generated by the vehicle, based on the information about the target traveling path and the target motion state amount; outputting a first control command for obtaining the target steering angle to the steering apparatus; and outputting a second control command for obtaining the target brake force to the brake apparatus.

In addition, a vehicle motion control system according to the present invention is, in one aspect thereof, a vehicle motion control system including: a steering apparatus which is provided in a vehicle; a brake apparatus which is provided in the vehicle; an external information acquisition apparatus which acquires external information about the vehicle; a vehicle motion state detection apparatus which acquires a motion state amount of the vehicle; and a controller, wherein the controller acquires, based on information about a target traveling path on which the vehicle travels, the information having been acquired by the external information acquisition apparatus, a normative motion state amount necessary for the vehicle to trace the target traveling path, acquires a target motion state amount necessary for generating a yaw moment to cancel unstable behavior of the vehicle, based on the normative motion state amount and the motion state amount of the vehicle acquired from the vehicle motion state detection apparatus, acquires a target steering angle for generating a steering angle moment and a target brake force for generating a brake moment, to obtain a necessary yaw moment generated by the vehicle, based on the information about the target traveling path and the target motion state amount, outputs a first control command for obtaining the target steering angle to the steering apparatus, and outputs a second control command for obtaining the target brake force to the brake apparatus.

Effects of the Invention

The present invention provides a vehicle motion control apparatus, a vehicle motion control method, and a vehicle motion control system that can achieve both course traceability and behavior stability in automated driving.

BRIEF DESCRIPTION OF THE DRAWINGS

FIG. 17 illustrates a course-derived normative yaw rate.

MODE FOR CARRYING OUT THE INVENTION

Hereinafter, an example of the present invention will be described with reference to a drawing.

Figure 1:
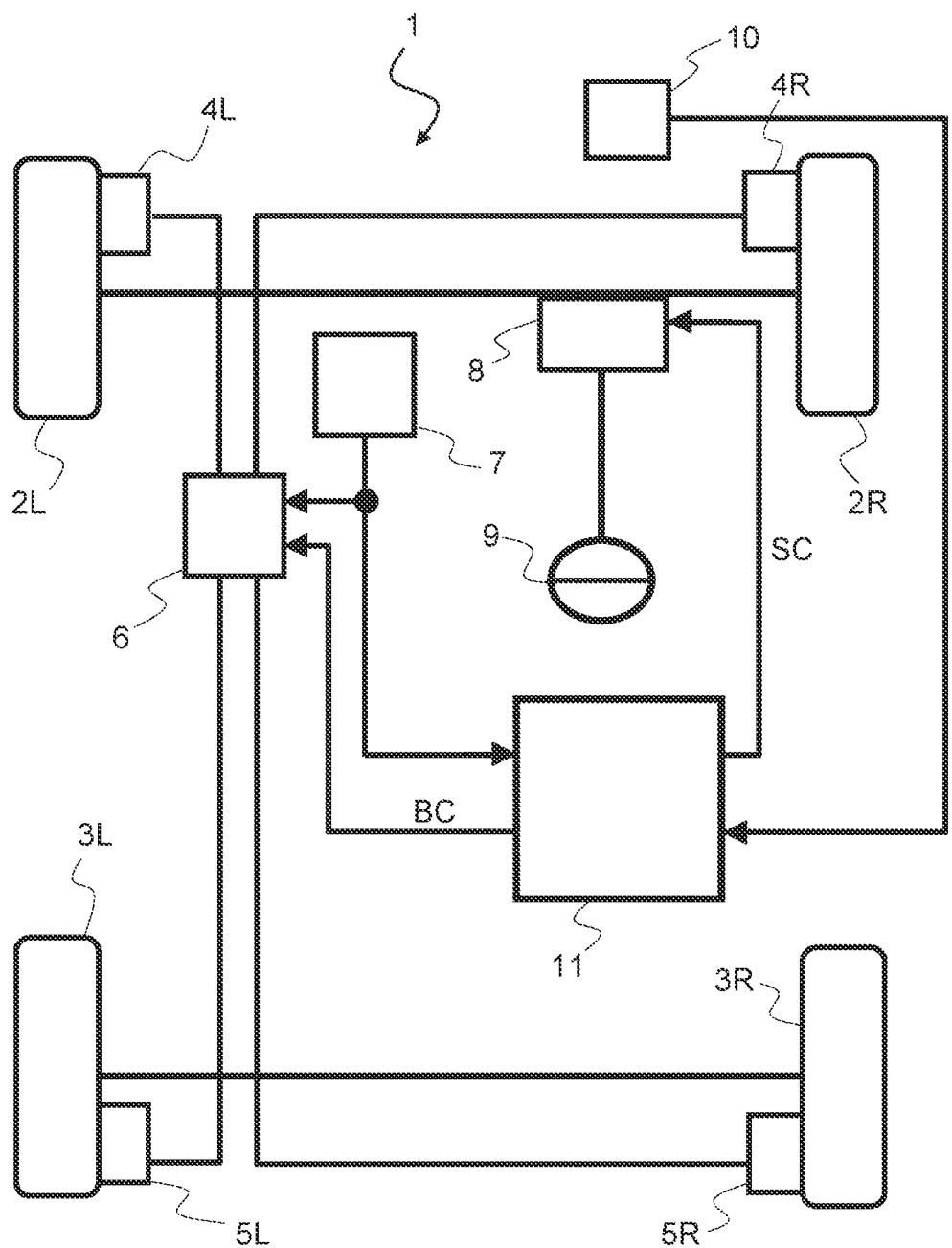
FIG. 1 is a schematic configuration diagram illustrating a vehicle motion control system according to an example of the present invention.

FIG. 1 is a schematic configuration diagram illustrating a vehicle motion control system according to an example of the present invention. A vehicle 1, to which this control system is applied, is a four-wheeled vehicle capable of performing driving assistance or automated driving, and includes a brake apparatus capable of controlling the brake force of each individual wheel of the four wheels of vehicle 1. That is, vehicle 1 includes a left front wheel 2L, a right front wheel 2R, a left rear wheel 3L, and a right rear wheel 3R, which are equipped with wheel cylinders 4L, 4R, 5L, and 5R, respectively, forming a hydraulic pressure brake apparatus. Vehicle 1 also includes a wheel cylinder fluid pressure control apparatus 6, a vehicle information acquisition apparatus 7, an electric power steering apparatus 8, a steering wheel 9, an external information acquisition apparatus 10, a control apparatus 11, etc.

Wheel cylinder fluid pressure control apparatus 6 is an electronic control apparatus, as typified by a sideslip prevention apparatus referred to as a VDC (Vehicle Dynamics Control) or a VSC (Vehicle Stabilization Control). Wheel cylinder fluid pressure control apparatus 6 acquires various kinds of vehicle information, such as information about the traveling velocity and traveling state of the vehicle, from vehicle information acquisition apparatus 7 and controls a brake fluid pressure (a hydraulic pressure) applied to each of wheel cylinders 4L, 4R, 5L, and 5R based on the acquired vehicle information. In addition, vehicle information such as an acceleration rate and a yaw rate generated in vehicle 1, the vehicle information having been acquired by vehicle information acquisition apparatus 7, is input to control apparatus 11 and is used for calculation of a traveling path, for example.

Electric power steering apparatus 8 is a steering apparatus that steers front wheels 2L and 2R of vehicle 1 via the rotation operation of steering wheel 9. Electric power steering apparatus 8 can assist the driver in the operation of steering wheel 9 by using the torque generated by a motor and can perform automated steering of front wheels 2L and 2R by using the motor. Electric power steering apparatus 8 includes, for example, a steering torque sensor for detecting the steering torque and a drive unit for driving the motor, in addition to the motor.

External information acquisition apparatus 10 may include a camera apparatus (a stereo camera, a monocular camera, a surround view camera, etc.), a radar apparatus (a lidar apparatus, a millimeter-wave radar, etc.), a sonar, a GPS (Global Positioning System), an HD-MAP, etc., and acquires information about the traveling location of vehicle 1 and information about the traveling environment such as the road ahead of vehicle 1. External information acquisition apparatus 10 functions as an external information recognition apparatus that acquires information about the surrounding environment of vehicle 1.

Control apparatus 11 is a control unit that includes a processor, a memory, an input-output interface, and a bus connecting these elements, and is formed by an electronic control apparatus in which a microcomputer functions as a main element. Control apparatus 11 performs calculation based on various kinds of input information and outputs calculation results. Control apparatus 11 has, as software, functions of controlling braking and steering, based on various kinds of information acquired from external information acquisition apparatus 10, wheel cylinder fluid pressure control apparatus 6, vehicle information acquisition apparatus 7, etc. Control apparatus 11 outputs a torque command (a steering command SC) to electric power steering apparatus 8 and outputs a target brake fluid pressure command (a brake command BC) to wheel cylinder fluid pressure control apparatus 6.

In this way, control apparatus 11 functions as a vehicle motion control apparatus that controls the steering angle of electric power steering apparatus 8, which is a steering-related actuator installed in vehicle 1, and that prevents sideslip via wheel cylinder fluid pressure control apparatus 6.

Comparative Example

Figure 2:
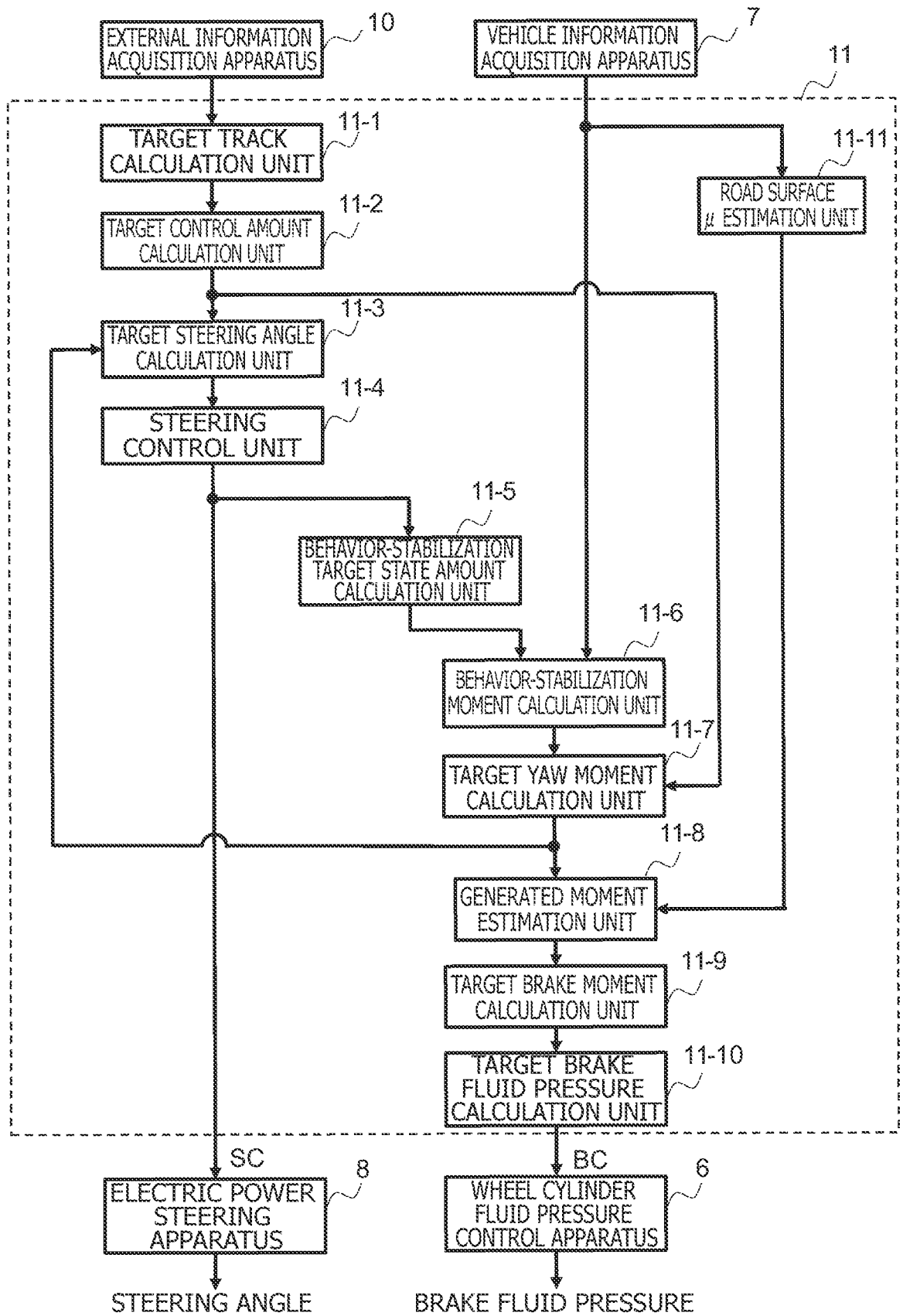
FIG. 2 is a block diagram illustrating a main part of a vehicle motion control apparatus prior to the present invention.
Figure 3:
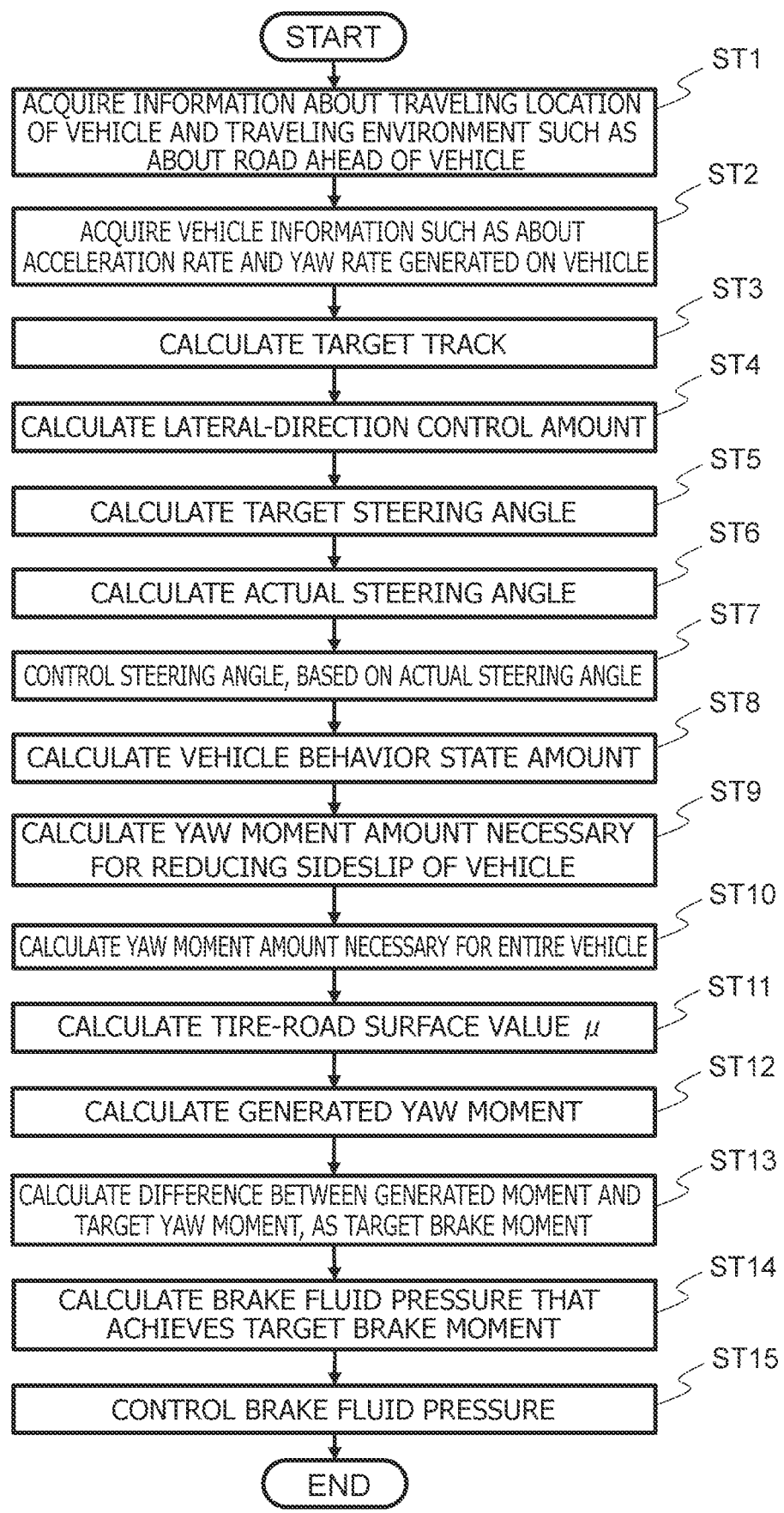
FIG. 3 is a flowchart illustrating a vehicle motion control method performed by the vehicle motion control apparatus in FIG. 2.

FIG. 2 illustrates a main part of a vehicle motion control apparatus used in the consideration that has led to the present invention. FIG. 2 illustrates a comparative example to be compared with the following examples. FIG. 3 is a flowchart illustrating a vehicle motion control method performed by the vehicle motion control apparatus in FIG. 2.

In FIG. 2, the vehicle motion control apparatus is part of the function of control apparatus 11 and includes functions such as a target track calculation unit 11-1, a target control amount calculation unit 11-2, a target steering angle calculation unit 11-3, a steering control unit 11-4, a behavior-stabilization target state amount calculation unit 11-5, a behavior-stabilization moment calculation unit 11-6, a target yaw moment calculation unit 11-7, a generated moment estimation unit 11-8, a target brake moment calculation unit 11-9, a target brake fluid pressure calculation unit 11-10, a road surface μ estimation unit 11-11, etc., as hardware or software that realizes these functions.

First, external information acquisition apparatus 10 acquires, for example, information about the traveling location of vehicle 1 and the traveling environment such as about the road ahead of vehicle 1 (step ST1). In addition, external information acquisition apparatus 10 acquires vehicle information such as about the acceleration rate and the yaw rate generated on vehicle 1 from vehicle information acquisition apparatus 7 (step ST2). For example, the information such as about the location and the traveling environment acquired by external information acquisition apparatus 10 is input to target track calculation unit 11-1. Target track calculation unit 11-1 calculates a target track, which is a desirable traveling path on which vehicle 1 travels, based on the information input from external information acquisition apparatus 10 (step ST3).

Next, target control amount calculation unit 11-2 calculates a lateral-direction control amount, e.g., a target lateral force value Fy* [N] necessary for vehicle 1 to travel on the target track, in accordance with the following mathematical equation (1), in view of the traveling location and traveling orientation of vehicle 1 with respect to the target track, based on the information input from external information acquisition apparatus 10 (step ST4).

[Equation 1]

$$Fy^* = m\frac{2}{t_p^2} \text{error} \quad (1)$$

In mathematical equation (1), m represents the vehicle weight [kg], $t_P$ represents the expected time [sec] of arrival at a target transfer point, and error represents the locational deviation [m] with respect to the target transfer point.

Next, in step ST5, target steering angle calculation unit 11-3 calculates a target steering angle δ° necessary for achieving both of the target control amount Fy* [N] necessary for vehicle 1 to travel on the target track and a target yaw moment M* [Nm] necessary for vehicle behavior stabilization to be described below, by using the following mathematical equations (2) to (4).

[Equation 2]

Equation of Motion of Lateral Force:   (2)

$$Fy^* = -2(K_f + K_r)\beta - 2(L_f K_f - L_r K_r)\frac{r}{V} + 2K_f \delta^*$$

[Equation 3]

Equation of Motion of Moment:   (3)

$$M^* = -2(L_f K_f - L_r K_r)\beta - 2(L_f^2 K_f + L_r^2 K_r)\frac{r}{V} + 2L_f K_f \delta^*$$

[Equation 4]

$$\delta^* = \frac{(K_f + K_r)M^* - (L_f K_f - L_r K_r)Fy^*}{(L_f + L_r)K_f K_r} + (L_f + L_r)\frac{r}{V} \quad (4)$$

In mathematical equations (2) to (4), $K_f$ represents tire cornering power [N/rad] of the front wheels, $K_r$ represents tire cornering power [N/rad] of the rear wheels, β represents the sideslip angle [rad], δ* represents the target steering angle [rad], $L_f$ represents the distance [m] between the centroid point of the vehicle and the front wheel axle, $L_r$ represents the distance between the centroid point of the vehicle and the rear wheel axle [m], γ represents the yaw rate [rad/sec], and V represents the vehicle velocity [m/sec].

Next, steering control unit 11-4 calculates an actual steering angle δ [rad] for the steering system such as electric power steering apparatus 8 to control the tire steering angle based on the target steering angle δ* (step ST6). Next, based on calculated actual steering angle δ [rad], steering control unit 11-4 outputs steering command SC to electric power steering apparatus 8, to control the steering angle (step ST7). In addition, steering control unit 11-4 outputs calculated actual steering angle δ [rad] to behavior-stabilization target state amount calculation unit 11-5.

As is the case with a general sideslip prevention apparatus, behavior-stabilization target state amount calculation unit 11-5 calculates a target vehicle behavior state amount based on actual steering angle δ [rad], e.g., a yaw rate $\gamma_{str}$ [rad/sec] based on the steering angle, as expressed by the following mathematical equation (5)(step ST8).

[Equation 5]

$$\frac{\gamma_{str}(s)}{\delta(s)} = \frac{2mVL_fK_fs + 4K_fK_r(L_f + L_r)}{mVIs^2 + \{2m(L_f^2K_f + L_r^2K_r) + 2I(K_f + K_r)\}s + \left\{\frac{4K_fK_r}{V}(L_f + L_r)^2 - 2mV(L_fK_f - L_rK_r)\right\}} \quad (5)$$

In mathematical equation (5), s represents a Laplace operator.

Next, as is the case with a general sideslip prevention apparatus, behavior-stabilization moment calculation unit 11-6 calculates a yaw moment amount $M_{stability}$ [Nm] necessary for reducing a sideslip of the vehicle by using any calculation method $f_{stability}$ (step ST9). While not normally calculated, yaw moment amount $M_{stability}$ is calculated when occurrence of a sideslip such as spin of a vehicle is detected from the vehicle information acquired by vehicle information acquisition apparatus 7.

[Equation 6]

$$M_{stability}=f_{stability}(\gamma_{str},\gamma,YG,V) \tag{6}$$

In mathematical equation (6), YG represents a lateral acceleration rate [m/sec²].

Next, target yaw moment calculation unit 11-7 calculates target yaw moment M* [Nm] necessary for the entire vehicle 1 in view of a reference yaw moment $M_{linear}$ [Nm] generated when the lateral control necessary for the vehicle to travel on the target track, the lateral control having been calculated by target control amount calculation unit 11-2, is performed and in view of yaw moment $M_{stability}$ [Nm] necessary for stabilizing the vehicle behavior, the yaw moment $M_{stability}$ [Nm] having been calculated by behavior-stabilization moment calculation unit 11-6 (step ST10).

[Equation 7]

$$M_{linear} = \frac{d}{dt}\left(\frac{1}{mV}Fy^*\right) \tag{7}$$

[Equation 8]

$$M^* = M_{linear} + M_{stability} \tag{8}$$

The target yaw moment calculated by target yaw moment calculation unit 11-7 is input to target steering angle calculation unit 11-3 and generated moment estimation unit 11-8. In addition, road surface p estimation unit 11-11 has calculated a tire-road surface value μ[-] necessary for calculating the upper limits of the tire force that can be generated between the road surface and an individual tire, from various kinds of sensors of vehicle information acquisition apparatus 7 (step ST11).

Generated moment estimation unit 11-8 first estimates requested lateral force values of front wheels 2L and 2R and rear wheels 3L and 3R necessary for achieving the target steering angle and the target yaw moment. Based on tire-mad surface value μ calculated by road surface p estimation unit 11-11, the upper limits of the tire force are estimated. If the requested lateral force values of front wheels 2L and 2R and rear wheels 3L and 3R are less than, or equal to, the respective upper limits of the tire force, since both vehicle stabilization and course traceability can be achieved by the steering control alone, no moment based on the brakes is needed. However, if the requested lateral force values of front wheels 2L and 2R and rear wheels 3L and 3R are not less than, or equal to, their respective upper limits of the tire force, the deficiency in the moment is generated by the brakes.

As expressed by the following mathematical equations (9) to (12), generated moment estimation unit 11-8 calculates the generated lateral force of front wheels 2L and 2R and rear wheels 3L and 3R, and based on the generated lateral force, generated moment estimation unit 11-8 calculates a generated yaw moment $M_{act}$ [Nm] as expressed by the following mathematical equation (13)(step ST12).

[Equation 9]

$$Fy_f^* = \frac{L_r Fy^* + M^*}{L_f + L_r} \tag{9}$$

[Equation 10]

$$Fy_f^* = \frac{L_f Fy^* - M^*}{L_f + L_r} \tag{10}$$

[Equation 11]

$$Fy_f^{lim} = \lim(Fy_f^*, -\mu W_f, \mu W_f) \tag{11}$$

[Equation 12]

$$Fy_r^{lim} = \lim(Fy_r^*, -\mu W_r, \mu W_r) \tag{12}$$

[Equation 13]

$$M_{act} = L_f Fy_f^{lim} - L_r Fy_r^{lim} \tag{13}$$

In mathematical equations (9) to (13), $Fy_f^*$ represents the target lateral force value [N] of the front wheels, $Fy_r^*$ represents the target lateral force value [N] of the rear wheels, $Fyt_f^{lim}$ represents the generated lateral force value [N] of the front wheels, $Fy_r^{lim}$ represents the generated lateral force value [N] of the rear wheels, $W_f$ represents the weight [N] of the front wheels, and $W_r$ represents the weight [N] of the rear wheels.

Next, target brake moment calculation unit 11-9 calculates the difference between the generated moment and the target yaw moment, as a target brake moment $M_{brake}$ [Nm] (step ST13).

[Equation 14]

$$M_{brake}=M^*-M_{act} \tag{14}$$

Target brake fluid pressure calculation unit 11-10 calculates a brake fluid pressure that achieves target brake moment $M_{brake}$ (step ST14). For example, when the same brake fluid pressure is applied to all the front and rear wheels, the following mathematical equations (15) and (16) are used to calculate the brake fluid pressure.

[Equation 15]

$$P_{brake}^{FL} = P_{brake}^{RL} = \frac{M_{brake}}{B_f T_f + B_r T_r}; \tag{15}$$

When $M_{brake}$ is counter-clockwise turning moment

[Equation 16]

$$P_{brake}^{FR} = P_{brake}^{RR} = \frac{M_{brake}}{B_f T_f + B_r T_r}; \tag{16}$$

When $M_{brake}$ is clockwise turning moment

Control apparatus 11 outputs, as brake command BC, a command indicating the target brake fluid pressure calculated by target brake fluid pressure calculation unit 11-10 to wheel cylinder fluid pressure control apparatus 6, to control the brake fluid pressure (step ST15).

In the system in which vehicle 1 autonomously travels on the target track in accordance with the above calculation, if the vehicle becomes unstable, for example, if the vehicle sideslips, a target value for tracing the target track and a target value necessary for vehicle stabilization are allocated to steering and braking. As a result, both course traceability and behavior stability can be achieved in view of the limit of the tire-road surface friction force.

However, the above comparative example is a system configuration to which a conventional sideslip prevention apparatus is applied for other than its intended use. In addition, the target yaw moment is calculated based on the steering angle and is fed back to the target steering angle, that is, to the counter-steering amount.

In the case of a general sideslip prevention apparatus, a greater counter-steering amount results in a greater target yaw moment amount. Because this is a positive feedback, there is a possibility that both steering angle and brake moment amount may become excessive.

In addition, the steering mainly causes lateral force, and there is a limit to the friction force that can be generated between the road surface and the tires. Therefore, there is a possibility that a sufficient moment may not be obtained by the steering alone.

To solve the problems as described with reference to the above comparative example, the present inventors, etc., continued further investigation and consideration and have solved these problems.

The following first to ninth examples described below represent a vehicle motion control apparatus, a vehicle motion control method, and a vehicle motion control system which can solve the problems that could be caused by the above comparative example and which can achieve both course traceability and behavior stability in automated driving.

First Example

Figure 4:
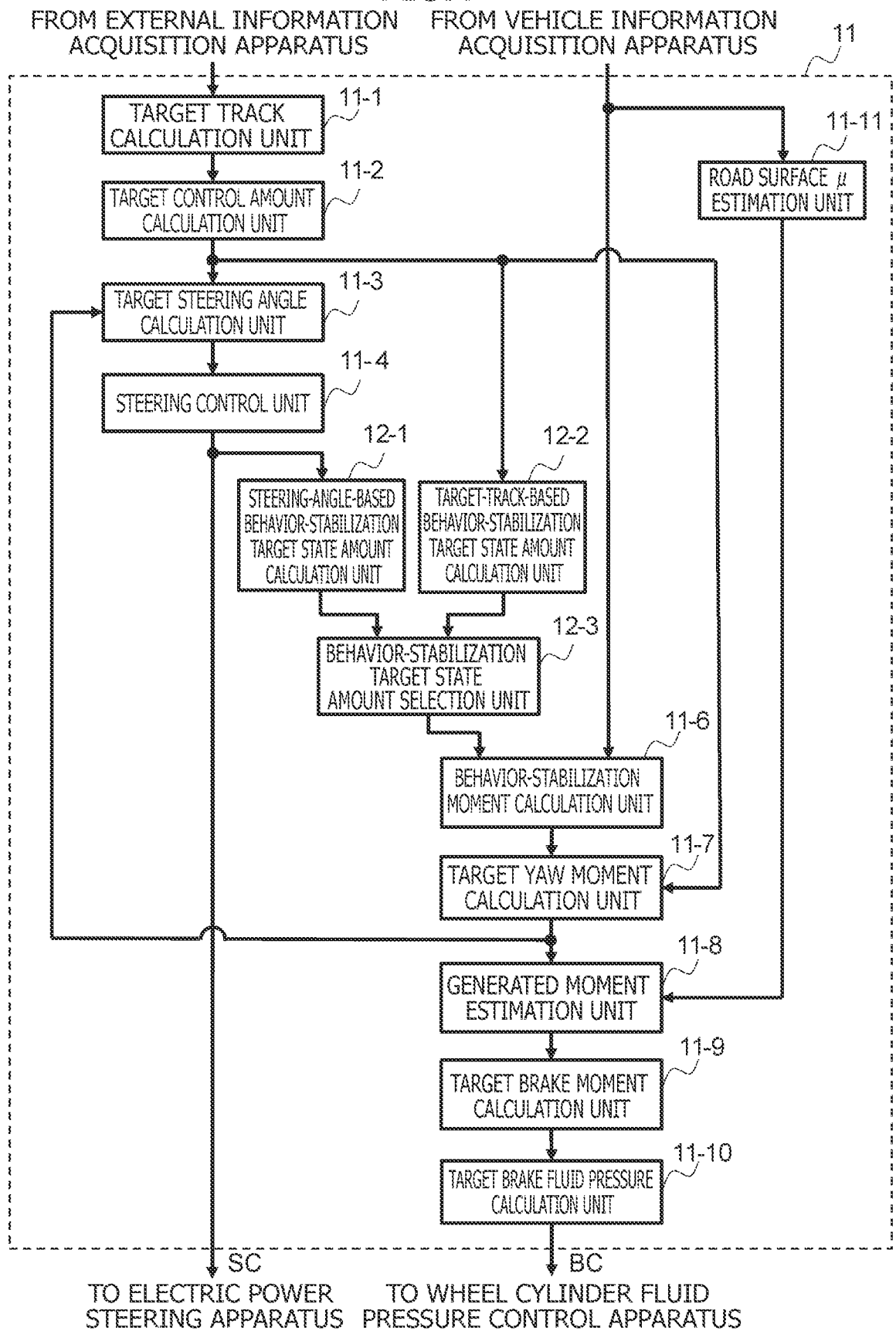
FIG. 4 is a block diagram illustrating a main part of a vehicle motion control apparatus according to a first example of the present invention.
Figure 5:
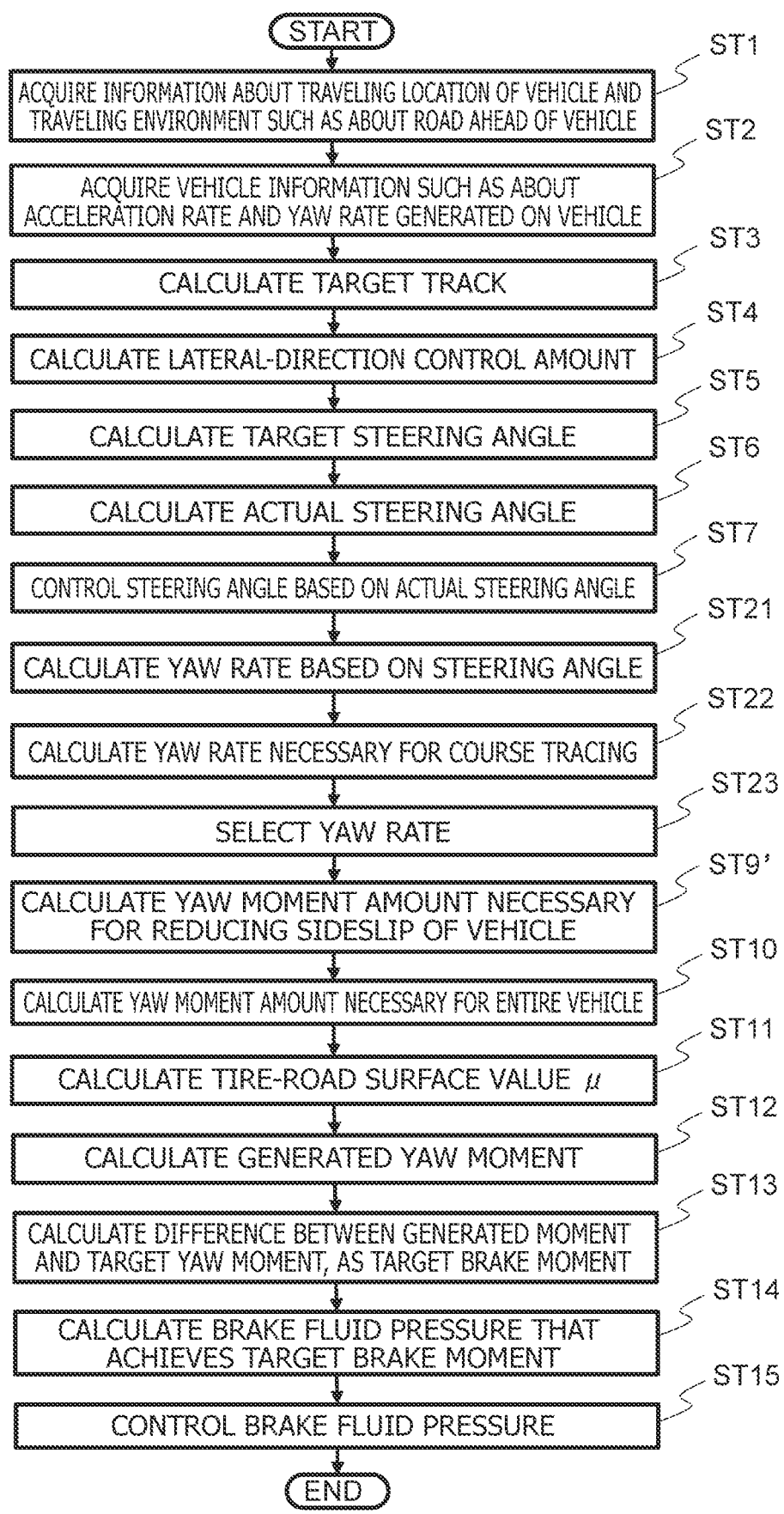
FIG. 5 is a flowchart illustrating a vehicle motion control method according to the first example of the present invention.

FIG. 4 is a block diagram illustrating a main part of a vehicle motion control apparatus according to a first example of the present invention. FIG. 5 is a flowchart illustrating a vehicle control method according to the first example of the present invention. For ease of description, the same components and the same steps of the first example in FIGS. 4 and 5 and the comparative example in FIGS. 2 and 3 will be denoted by the same reference numerals, and description thereof will be omitted. In addition, while a flowchart is illustrated in FIG. 5 for convenience, the actual procedure may differ from the procedure in the flowchart.

This first example differs from the above comparative example in FIG. 2 in that the first example includes a steering-angle-based behavior-stabilization target state amount calculation unit 12-1, a target-track-based behavior-stabilization target state amount calculation unit 12-2, and a behavior-stabilization target state amount selection unit 12-3, in place of behavior-stabilization target state amount calculation unit 11-5.

Steering-angle-based behavior-stabilization target state amount calculation unit 12-1 calculates steering-angle-based yaw rate $\gamma_{str}$ [rad/sec], based on actual steering angle $\delta$ [rad] output from steering control unit 11-4 (step ST21). Target-track-based behavior-stabilization target state amount calculation unit 12-2 calculates a yaw rate $\gamma_{course}$ [rad/sec] necessary for the vehicle to trace the course ideally, based on target control amount (target lateral force value) Fy* [N] necessary for the vehicle to travel on the track, the target control amount having been output from the target control amount calculation unit 11-2 (step ST22).

[Equation 17]

$$\gamma_{course} = \frac{1}{mV}Fy^* \quad (17)$$

Behavior-stabilization target state amount selection unit 12-3 is a target state amount $\gamma^*$ [rad/sec] generation unit of a sideslip prevention apparatus and selects steering-angle-based yaw rate $\gamma_{str}$ [rad/sec] during manual driving by the driver and yaw rate $\gamma_{course}$ [rad/sec] necessary for course tracing during automated driving (step ST23).

$\gamma^*=\gamma_{str}$: during manual driving by driver
$\gamma^*=\gamma_{course}$: during automated driving by driver Although behavior-stabilization moment calculation unit 11-6 performs the same processing as that according to the comparative example, behavior-stabilization moment calculation unit 11-6 uses target state amount $\gamma^*$ [rad/sec], to calculate yaw moment amount $M_{stability}$ [Nm] necessary for reducing a sideslip of the vehicle (step ST9').

[Equation 18]

$$M_{stability}=f_{stability}(\gamma^*,\gamma,YG,V) \quad (18)$$

The subsequent operation is the same as that according to the above comparative example.

With the above configuration, the steering-angle-based behavior-stabilization target state amount or the target-track-based behavior-stabilization target state amount can be selected.

Thus, according to the present first example, the behavior-stabilization target state amount during automated driving is based on the target track, not the vehicle steering angle. Therefore, since the behavior stabilization moment does not coordinate with the counter-steering amount, a steering angle and brake fluid pressure that achieve both course traceability and vehicle behavior can be given more suitably.

Second Example

Figure 6:
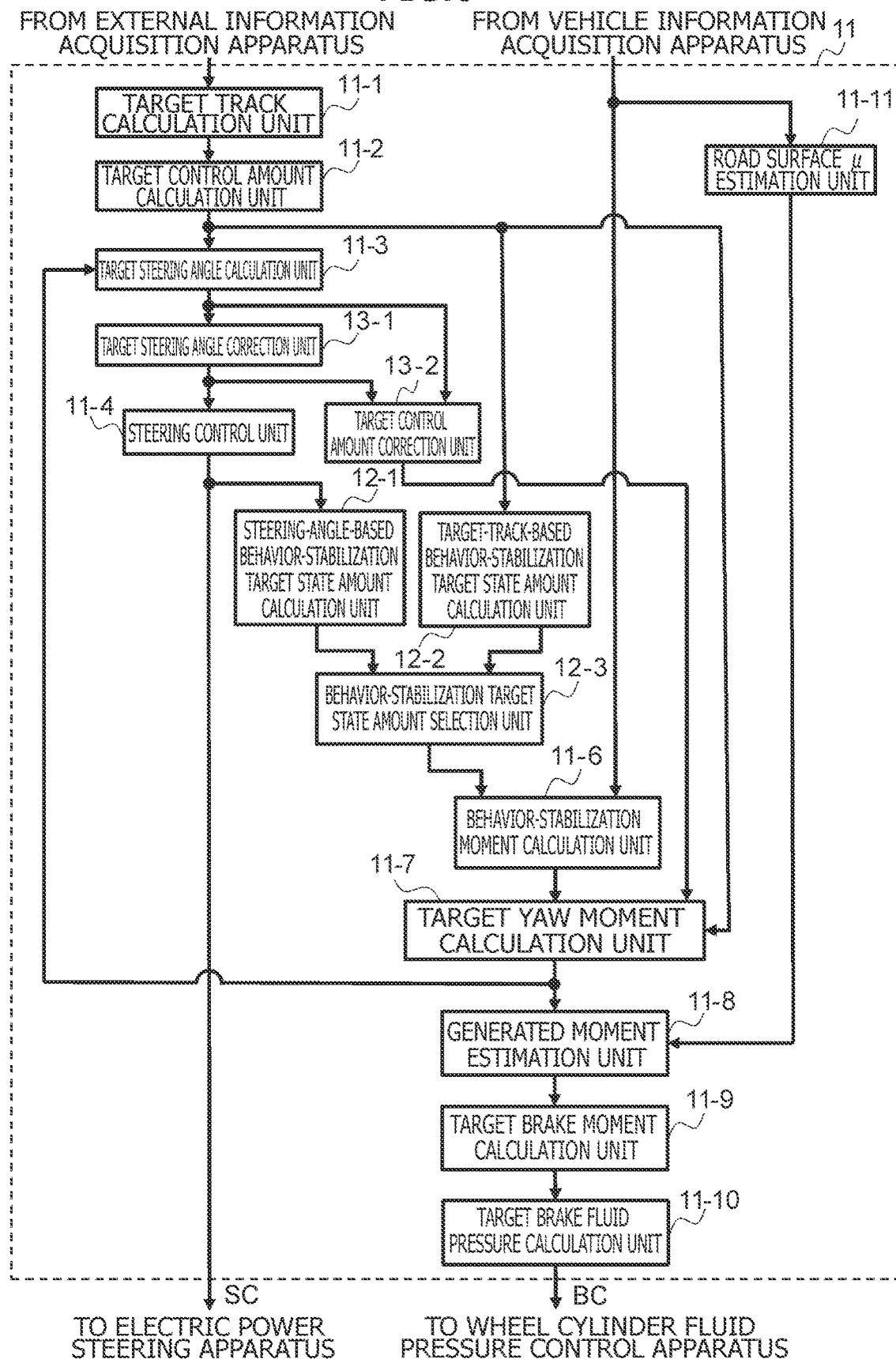
FIG. 6 is a block diagram illustrating a main part of a vehicle motion control apparatus according to a second example of the present invention.
Figure 7:
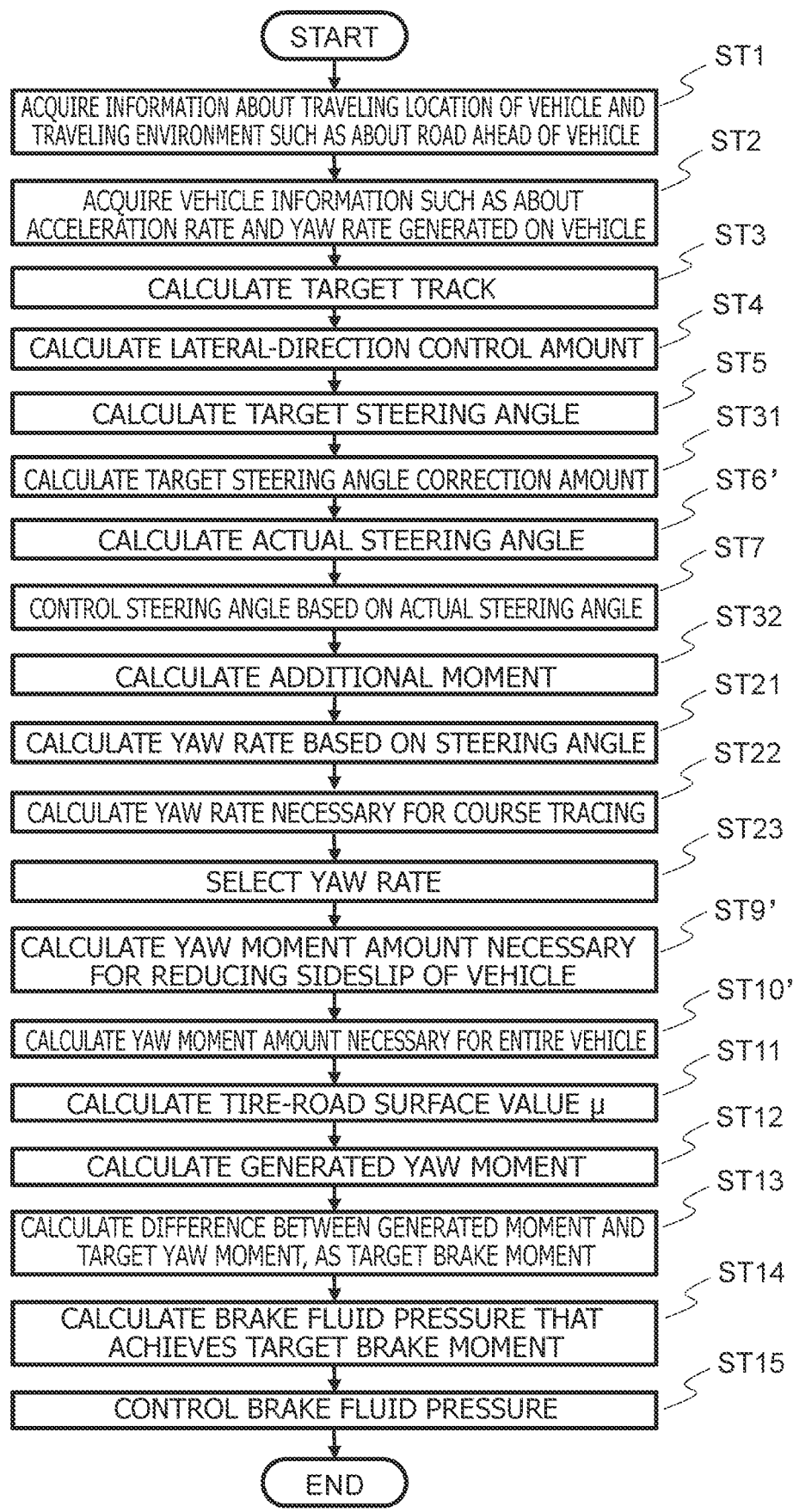
FIG. 7 is a flowchart illustrating a vehicle motion control method according to the second example of the present invention.

FIG. 6 is a block diagram illustrating a main part of a vehicle motion control apparatus according to a second example of the present invention. FIG. 7 is a flowchart illustrating a vehicle control method according to the second example of the present invention.

For ease of description, the same components and the same steps between the second example in FIGS. 6 and 7 and the first example in FIGS. 4 and 5 will be denoted by the same reference numerals, and description thereof will be omitted. In addition, although a flowchart is illustrated in FIG. 7 for convenience, the actual procedure may differ from the procedure in the flowchart.

This second example is directed to a coordination system in which automated driving and manual driving by a driver are simultaneously performed. The second example assumes a vehicle equipped with general electronic power steering in which the tire steering angle and the steering wheel angle are directly connected. There are cases in which vehicle behavior is disturbed during automated driving. In these cases, if the steering angle is quickly controlled to stabilize the vehicle, the steering wheel is also quickly rotated. The following description will be made on a technique for achieving both vehicle behavior and course traceability while reducing the steering control in terms of safety.

This second example differs from the above first example in that the second example includes a target steering angle correction unit 13-1 and a target control amount correction unit 13-2. Target steering angle correction unit 13-1 adjusts a steering angle control intervention amount with respect to target steering angle $\delta^*$ necessary for achieving both target control amount Fy* [N] necessary for the vehicle to travel on the target track and target yaw moment M* [Nm] necessary for stabilizing the vehicle behavior. For example, target steering angle correction unit 13-1 adjusts the sensitivity of the steering control by using any adjustment term ω (0≤ω≤1) with respect to a current steering angle amount $\delta_{act}$ [rad] and target steering angle δ*, to calculate a target steering angle correction amount δ** [rad] (step ST3).

[Equation 19]

$$\delta^{**} = \delta_{act} + \overline{\omega}(\delta^* - \delta_{act}) \quad (19)$$

Steering control unit 11-4 calculates actual steering angle δ [rad] of electric power steering apparatus 8 based on target steering angle δ calculated in accordance with the above mathematical equation (19)(step ST6'). Based on actual steering angle δ [rad], steering control unit 11-4 outputs steering command SC to electric power steering apparatus 8, to control the steering angle (step ST7). In addition, steering control unit 11-4 enters calculated actual steering angle δ [rad] to steering-angle-based behavior-stabilization target state amount calculation unit 12-1**.

In addition, target control amount correction unit 13-2 estimates a deficiency Δθ [rad], which represents the change in vehicle yaw angle a period of time $t_P$ later caused by the correction of target steering angle δ* to target steering angle correction amount δ** and calculates an additional moment $M_{add}$ [Nm], which represents the moment that changes the vehicle yaw angle by Δθ in $t_P$ (step ST32).

[Equation 20]

$$M_{add} = \frac{d^2}{dt^2}\left(\frac{\delta^* - \delta^* \delta^*}{\delta^*} \gamma_{course} t_p\right) \quad (20)$$

The subsequent processing, that is, the processing of steering-angle-based behavior-stabilization target state amount calculation unit 12-1, target-track-based behavior-stabilization target state amount calculation unit 12-2, behavior-stabilization target state amount selection unit 12-3, and behavior-stabilization moment calculation unit 11-6 is the same as that according to the above first example.

Target yaw moment calculation unit 11-7 calculates yaw moment M* [Nm] necessary for the entire vehicle by adding reference yaw moment $M_{linear}$ [Nm] generated when lateral control necessary for the vehicle to travel on the target track is performed, yaw moment $M_{stability}$ [Nm] necessary for stabilizing the vehicle behavior, and additional moment $M_{add}$ [Nm] (step ST10').

[Equation 21]

$$M^* = M_{linear} + M_{stability} + M_{add} \quad (21)$$

The processing of road surface μ estimation unit 11-11, generated moment estimation unit 11-8, target brake moment calculation unit 11-9, and target brake fluid pressure calculation unit 11-10 is the same as that according to the above comparative example and first example.

According to the above second example, even when the vehicle behavior is disturbed during automated driving, rapid rotation of the steering wheel for vehicle stabilization is prevented.

It should be noted that reducing the steering control results in deviation of the traveling location from the target track. These have a tradeoff relationship and cannot be achieved simultaneously. However, by reducing the steering control and compensating for the deficiency in the change of the vehicle orientation with a brake moment, the traveling direction of the vehicle, on which the steering control is performed, is optimized with respect to the target track.

As a result, when a sideslip occurs during automated driving, the driver can easily perform steering intervention, and driver operation for maintaining course traceability and behavior stability can be assisted.

Third Example

Figure 8:
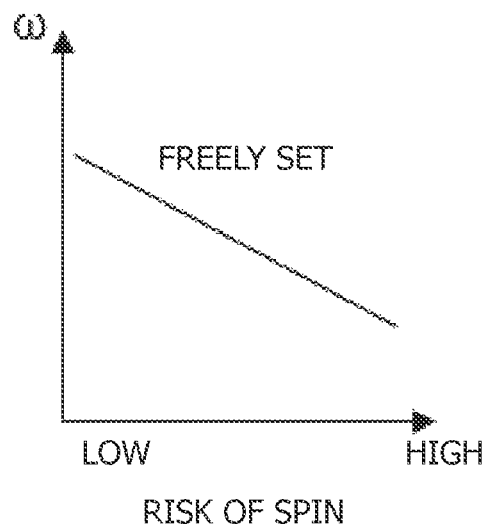
FIG. 8 illustrates a third example of the present invention and is a characteristic diagram illustrating a relationship between risk of a spin and an adjustment term for sensitivity of steering control.

In a third example, adjustment term ω for the sensitivity of the steering control in the second example is set in coordination with risk of a spin. As illustrated in FIG. 8, when there is higher risk of a spin, the vehicle behavior can be stabilized more easily by using the brake system rather than the steering system. Thus, the control amount on the steering system is reduced, and the control amount on the brake system is increased by the reduced control amount on the steering system. It is preferable that the gain of the weight be freely set.

Fourth Example

Figure 9:
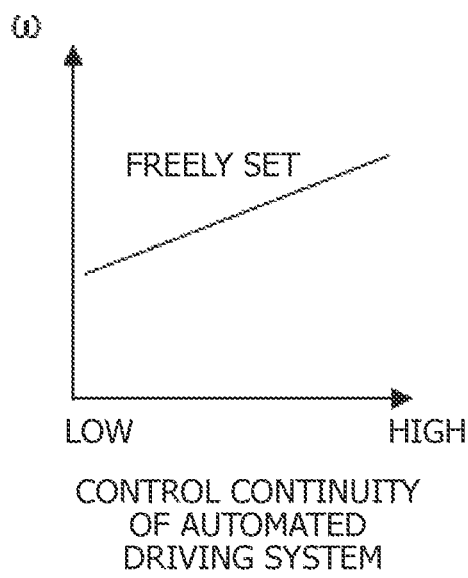
FIG. 9 illustrates a fourth example of the present invention and is a characteristic diagram illustrating a relationship between control continuity of an automated driving system and the adjustment term for the sensitivity of the steering control.

In a fourth example, adjustment term ω for the sensitivity of the steering control in the second example is set in coordination with the dependence on the automated driving system (contribution of the system). As illustrated in FIG. 9, when dependence on the automated driving system is low, in view of ease of driver override (steering intervention that allows the driver to operate the steering wheel) in which the automated driving system stops its control, the control amount on the steering system is reduced, and the control amount on the brake system is increased by the reduced control amount on the steering system. It is preferable that the gain of the weight be freely set.

Fifth Example

Figure 10:
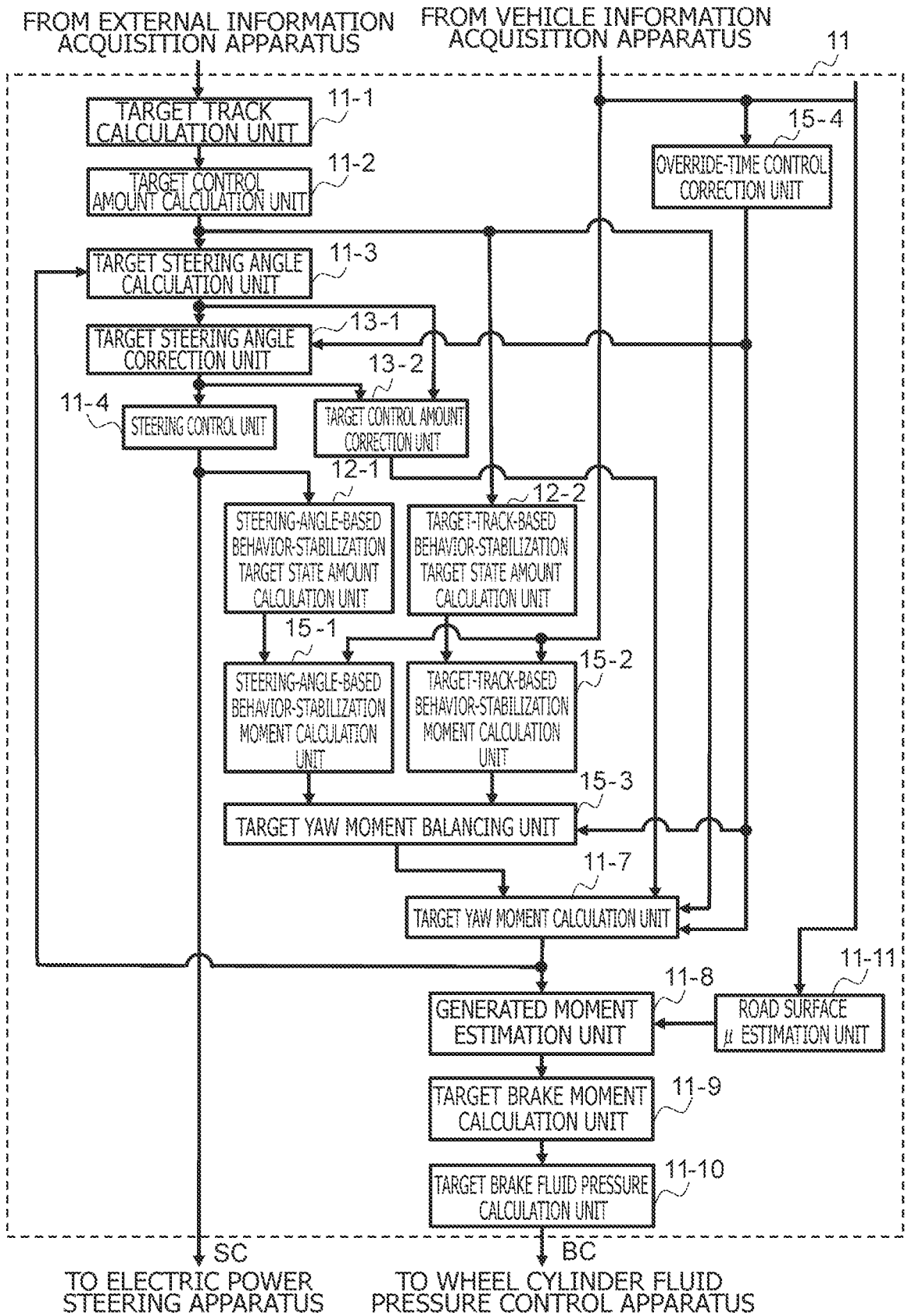
FIG. 10 is a block diagram illustrating a main part of a vehicle motion control apparatus according to a fifth example of the present invention.
Figure 11:
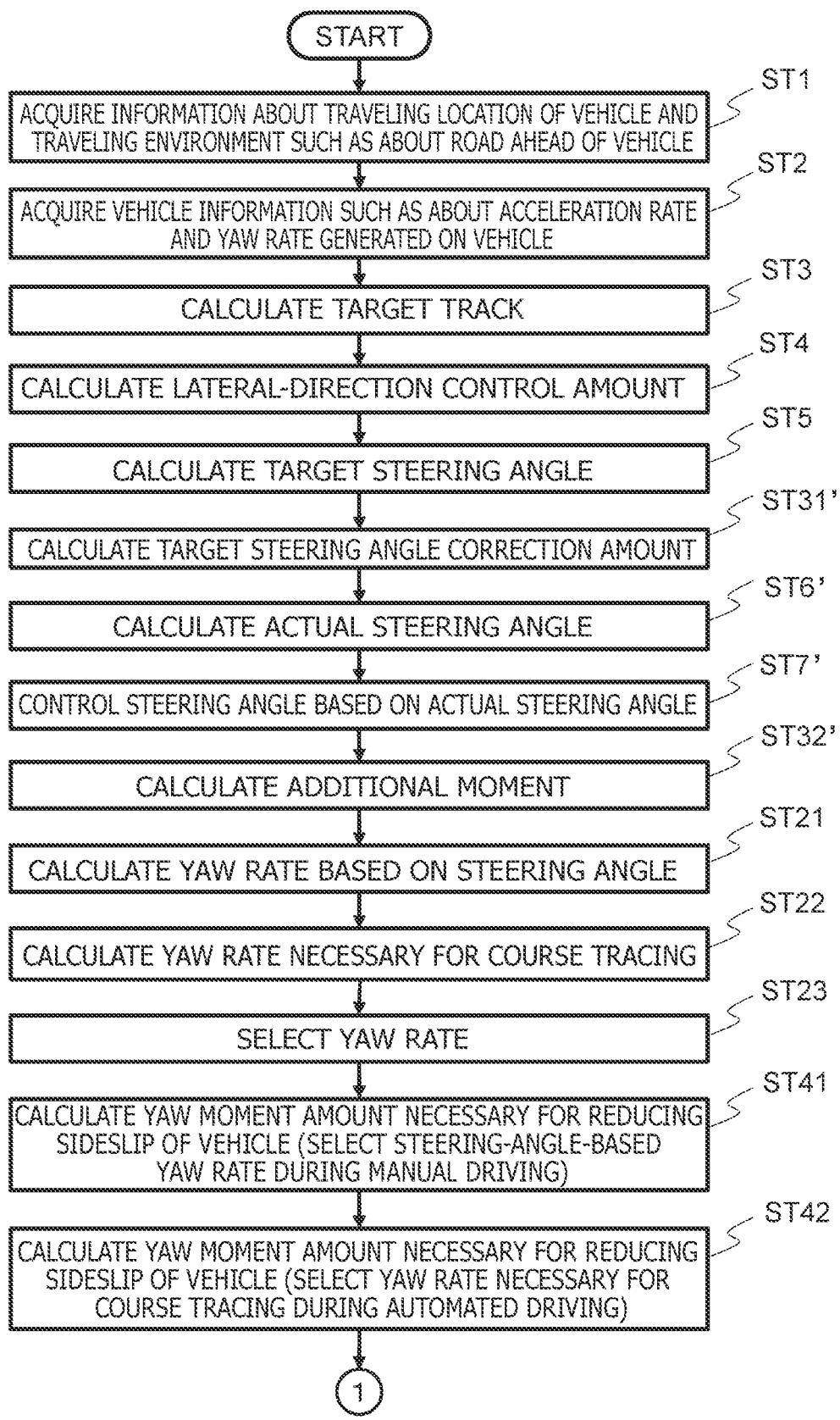
FIG. 11 is a flowchart illustrating the first half of a vehicle motion control method according to the fifth example of the present invention.
Figure 12:
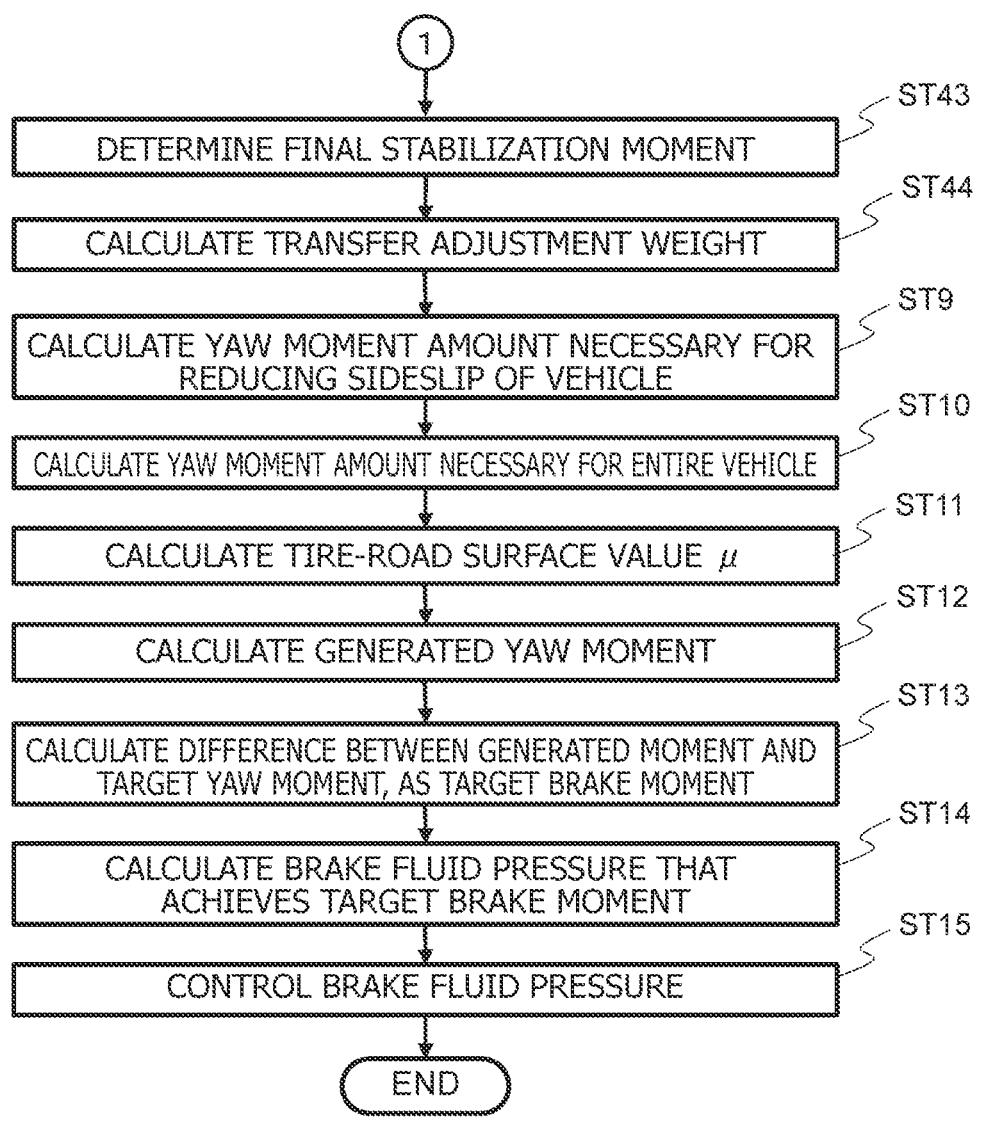
FIG. 12 is a flowchart illustrating the second half of the vehicle motion control method according to the fifth example of the present invention.

FIG. 10 is a block diagram illustrating a main part of a vehicle motion control apparatus according to a fifth example of the present invention. FIGS. 11 and 12 are flowcharts illustrating a vehicle control method according to the fifth example of the present invention.

For ease of description, the same components and the same steps between the fifth example in FIGS. 10 to 12 and the comparative example, first example, and second example will be denoted by the same reference numerals, and description thereof will be omitted. In addition, although flowcharts are illustrated in FIGS. 11 and 12 for convenience, the actual procedure may differ from the procedure in the flowcharts.

The present fifth example is directed to a system in which the target state amount during automated driving differs from the target state amount during manual driving. In this system, when the driver overrides the vehicle during automated driving and cancels the automated driving, the target state amount may become discontinuous, and the operation control amount and the brake control amount may also become discontinuous. Specifically, for example, when a sideslip occurs during automated driving, the target state amount of the sideslip prevention apparatus is based on a yaw rate necessary for tracing the course, and during manual driving, the target state amount of the sideslip prevention apparatus is based on a steering-angle-based yaw rate. Thus, the present example enables a smooth transition from automated driving to manual driving by the driver.

That is, control apparatus 11 according to the fifth example includes a steering-angle-based behavior-stabilization moment calculation unit 15-1, a target-track-based behavior-stabilization moment calculation unit 15-2, a target yaw moment balancing unit 15-3, and an override-time control correction unit 15-4, in addition to the components of control apparatus 11 in FIG. 6 according to the second example.

Override-time control correction unit 15-4 calculates a transfer adjustment weight ζ for switching control between automated driving and manual driving (step ST43). In FIG. 11, although override-time control correction unit 15-4 calculates the transfer adjustment weight ζ after a final stabilization moment is determined (step ST42), override-time control correction unit 15-4 may calculate transfer adjustment weight (in the period between when vehicle information acquisition apparatus 7 acquires vehicle information and when target yaw moment calculation unit 11-7 calculates the target yaw moment.

Basically, ζ is 1 during automated driving and ζ is 0 during manual driving. When the driver overrides the vehicle during automated driving and the automated driving is canceled and switched to manual driving, ζ is set from 1 to 0 in time Ts.

While target steering angle correction unit 13-1 performs the same processing using adjustment term ω as that according to the second example, a final adjustment term ω' is a value obtained by multiplying adjustment term ω by transfer adjustment weight ζ (step ST31').

[Equation 22]

$$\overline{\omega}^* = \overline{\omega} \cdot \zeta \tag{22}$$

In addition, while steering control unit 11-4 performs the same processing as that according to the second example, steering control unit 11-4 uses final adjustment term ω* in place of adjustment term ω (step ST7').

Similarly, while target control amount correction unit 13-2 performs the same processing as that according to the second example, target control amount correction unit 13-2 uses final adjustment term ω' in place of adjustment term ω (step ST32').

Steering-angle-based behavior-stabilization target state amount calculation unit 12-1 calculates steering-angle-based yaw rate $\gamma_{str}$, based on actual steering angle δ output from steering control unit 11-4.

In addition, target-track-based behavior-stabilization target state amount calculation unit 12-2 calculates yaw rate $\gamma_{course}$ necessary for the vehicle to trace the course ideally, based on target control amount (target lateral force value) Fy* necessary for the vehicle to travel on the track.

Basically, steering-angle-based behavior-stabilization moment calculation unit 15-1 performs the same processing as that of behavior-stabilization moment calculation unit 11-6 according to the comparative example. Steering-angle-based behavior-stabilization moment calculation unit 15-1 selects, as the target state amount, steering-angle-based yaw rate $\gamma_{str}$ [rad/sec] during manual driving by the driver (step ST41).

[Equation 23]

$$M_{driver} = f_{stability}(\gamma_{str}, \gamma, YG, V) \tag{23}$$

Target-track-based behavior-stabilization moment calculation unit 15-2 performs the same processing as that of behavior-stabilization moment calculation unit 11-6 according to the comparative example. Target-track-based behavior-stabilization moment calculation unit 15-2 selects, as the target state amount, yaw rate $\gamma_{course}$ [rad/sec] necessary for the vehicle to trace the course during automated driving (step ST42).

[Equation 24]

$$M_{course} = f_{stability}(\gamma_{course}, \gamma, YG, V) \tag{24}$$

When the driver performs override, target yaw moment balancing unit 15-3 determines the final stabilization moment from stabilization moment $M_{course}$ during automated driving and stabilization moment $M_{driver}$ during manual driving based on the time that has elapsed since the override by the driver (step ST43).

[Equation 25]

$$M_{stability} = (1-\zeta)M_{driver} + \zeta M_{course} \tag{25}$$

Basically, target yaw moment calculation unit 11-7 performs the same processing as that of the target yaw moment calculation unit according to the second example. However, after the switching to manual driving is completed, additional moment $M_{add}$ [Nm] for compensating for the deficiency in the change of the yaw angle is not necessary. Thus, for example, target yaw moment calculation unit 11-7 calculates the target yaw moment as follows.

[Equation 26]

$$M^* = M_{stability} + \zeta(M_{linear} + M_{add}) \tag{26}$$

Generated moment estimation unit 11-8, target brake moment calculation unit 11-9, target brake fluid pressure calculation unit 11-10, and road surface μ estimation unit 11-11 perform the same processing as that according to the above comparative example and the individual examples.

Sixth Example

Figure 13:
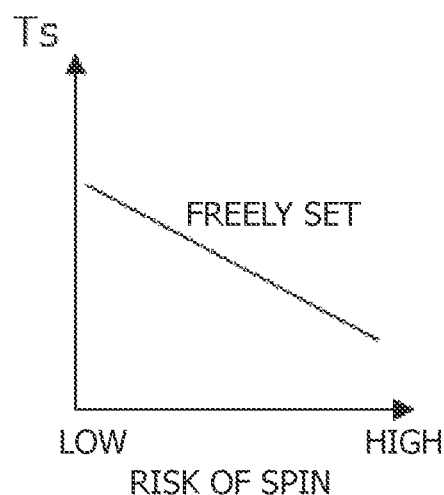
FIG. 13 illustrates a sixth example of the present invention and is a characteristic diagram illustrating a relationship between risk of a spin and time for transition to manual driving.

In a sixth example, as illustrated in FIG. 13, time Ts, in which adjustment term (for the sensitivity of the steering control according to the fifth example varies, is set in coordination with the magnitude of the disturbance of the vehicle behavior (magnitude of risk of a spin). When there is high risk of a spin, the vehicle behavior can be stabilized more easily by using the brake system rather than the steering system. Thus, by shortening time Ts, the interference with the driver operation can be reduced.

Seventh Example

Figure 14:
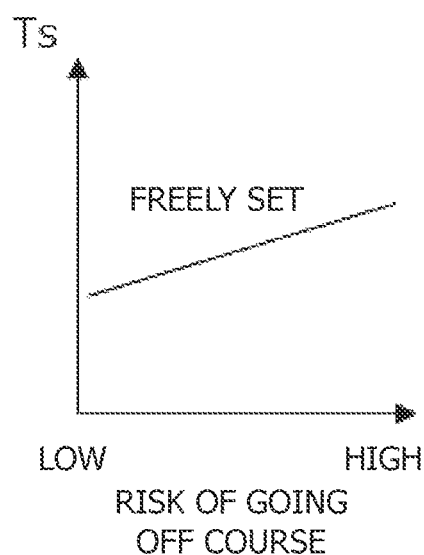
FIG. 14 illustrates a seventh example of the present invention and is a characteristic diagram illustrating a relationship between risk of going off course and the time for transition to manual driving.

In a seventh example, as illustrated in FIG. 14, time Ts, in which adjustment term ζ for the sensitivity of the steering control according to the fifth example varies, is set in coordination with the magnitude of the risk of going off course. When there is high risk of going off course, the vehicle is generally in an understeered state in which the actual degree of the vehicle's turning is less than the expected degree of the vehicle's turning. In this state, while a typical driver tries to turn the steering wheel further to increase the actual degree of the vehicle's turning, if the steering wheel is further turned in the understeered state, the understeering deteriorates. That is, since the driver tends to erroneously perform the steering in the understeered state, the assistance by the system is prolonged longer than normal by extending time Ts. In addition, regarding the risk of going off course, the gain of the weight may not necessarily be reduced to 0.

Figure 15:
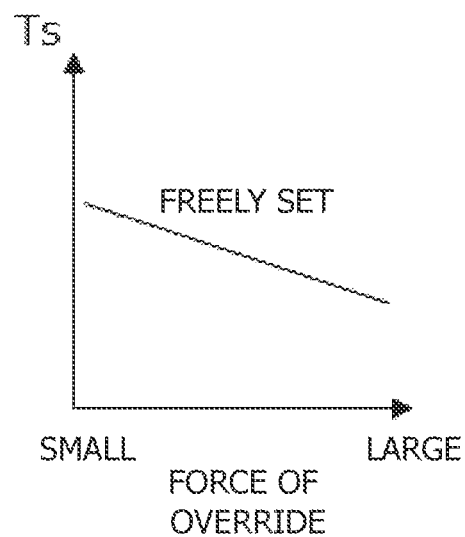
FIG. 15 illustrates an eighth example of the present invention and is a characteristic diagram illustrating a relationship between override force and the time for transition to manual driving.

Eighth Example in an eighth example, as illustrated in FIG. 15, time Ts, in which adjustment term (for the sensitivity of the steering control according to the fifth example varies, is set in coordination with the force of the override by the driver (for example, the steering torque value). When the force of the override applied by the driver is large, it is assumed that the driver has a strong intent to override the vehicle. Thus, by shortening time Ts, the interference with the driver operation can be reduced.

Ninth Example

Figure 16:
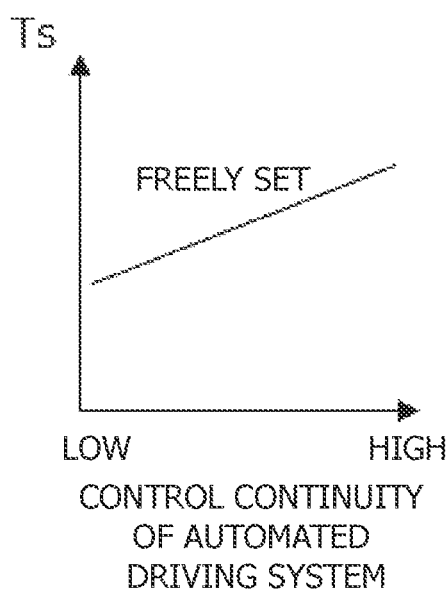
FIG. 16 illustrates a ninth example of the present invention and is a characteristic diagram illustrating a relationship between control continuity of an automated driving system and the time for transition to manual driving.

In a ninth example, as illustrated in FIG. 16, the adjustment term 4 for the sensitivity of the steering control according to the fifth example is set in coordination with the control continuity of the automated driving system (contribution of the system). When the control continuity of the automated driving system is low, the system stops the control. By shortening time Ts when the control is transferred to the driver, the interference with the driver operation can be reduced.

As described above, according to the present invention, a normative control amount based on the traveling path information, a target state amount based on the current vehicle state, and a spin prevention control amount based on the target state amount are calculated. Based on these calculated amounts, to balance the course traceability and the behavior stability, the target steering angle given to the steering apparatus and the four-wheel target brake force given to the brake apparatus are designed. In this way, the motion of the vehicle with respect to the target traveling path during automated driving is suitably controlled.

As a result, a vehicle motion control apparatus, a vehicle motion control method, and a vehicle motion control system that can achieve both course traceability and behavior stability during automated driving can be provided.

Hereinafter, technical concepts that can be understood from the above examples will be described, along with their respective advantageous effects.

As illustrated in FIGS. 4 and 5, a vehicle motion control apparatus, in one aspect thereof, includes a control unit which controls a steering apparatus and a brake apparatus that are provided in a vehicle. The control unit acquires, based on information about a target traveling path on which the vehicle travels, the information having been acquired by an external information acquisition unit, a normative motion state amount (a course-derived normative yaw rate) necessary for the vehicle to trace the target traveling path, acquires a target motion state amount (a behavior stabilization moment (ESC (VDC) during automated driving)) necessary for generating a yaw moment to cancel unstable behavior of the vehicle, based on the normative motion state amount and a motion state amount (a lateral G, a yaw rate) of the vehicle acquired from a vehicle motion state detection unit mounted in the vehicle, acquires a target steering angle for generating a steering angle moment and a target brake force for generating a brake moment, to obtain a necessary yaw moment generated by the vehicle, based on the information about the target traveling path and the target motion state amount, performs balancing and allocation, outputs a first control command (a steering angle) for obtaining the target steering angle to the steering apparatus, and outputs a second control command (a brake moment) for obtaining the target brake force to the brake apparatus.

With the above configuration, the traveling location and the stabilization moment are balanced, and the control amounts are allocated to the steering angle and brakes. Thus, both course traceability and behavior stability during automated driving can be achieved.

As illustrated in FIG. 17, a course-derived yaw rate is a VDC-required moment yaw rate component targeted at a steering angle yaw rate. The course-derived yaw rate is a VDC-required moment yaw rate component targeted at a course-derived normative yaw rate and approximately matches a dBeta component. Since there are cases in which course tracing cannot be performed (directions cannot be matched) without dBeta, this signal is used.

In a preferable mode of the vehicle motion control apparatus, as illustrated in FIGS. 6 and 7, the control unit acquires the target steering angle and the target brake force such that the brake moment compensates for the deficiency in a yaw moment generated by the steering angle moment in the necessary yaw moment.

With the above configuration, the brakes can compensate for the deficiency in the steering angle.

In another preferable mode, as illustrated in FIG. 8, the control unit acquires the target steering angle and the target brake force such that a ratio of the yaw moment generated by the steering angle moment drops and a ratio of the yaw moment generated by the brake moment increases as risk of a spin of the vehicle based on the motion state amount of the vehicle increases.

With the above configuration, when there is high risk of a spin, this risk can be reduced by dropping the control amount allocated to the steering angle and increasing the control amount allocated to the brakes.

In another preferable mode, as illustrated in FIG. 9, the control unit acquires the target steering angle and the target brake force such that a ratio of the yaw moment generated by the steering angle moment drops and a ratio of the yaw moment generated by the brake moment increases as dependence on automated driving control for causing the vehicle to travel autonomously drops.

With the above configuration, when contribution of the system is low, dependence on automated driving control can be reduced by dropping the control amount allocated to the steering angle and increasing the control amount allocated to the brakes.

In another preferable mode, as illustrated in FIGS. 10 to 12, the control unit acquires the target steering angle and the target brake force such that a ratio of a yaw moment generated by the steering angle moment drops and a ratio of a yaw moment generated by the brake moment increases when a driver of the vehicle intervenes in steering operation.

With the above configuration, when the driver overrides the vehicle, the driver's intent to perform a steering operation can be prioritized by dropping the control amount allocated to the steering angle and increasing the control amount allocated to the brakes.

In another preferable mode, as illustrated in FIG. 13, as risk of a spin of the vehicle based on the motion state amount of the vehicle increases, based on the intervention by the driver of the vehicle in steering operation, the control unit shortens time (Ts) for transition from automated driving control for causing the vehicle to travel autonomously to manual driving allowing the driver of the vehicle to drive the vehicle.

With the above configuration, when there is high risk of a spin, automated driving can be switched to manual driving by the driver within a short time by shortening the degradation time (time in which the adjustment term drops from 1 to 0).

In another preferable mode, as illustrated in FIG. 14, as risk of the vehicle going off the target traveling path increases, based on the intervention by the driver of the vehicle in steering operation, the control unit extends time (Ts) for transition from automated driving control for causing the vehicle to travel autonomously to manual driving allowing the driver of the vehicle to drive the vehicle.

With the above configuration, when there is high risk of the vehicle going off the target traveling path, automated driving can be gradually switched to manual driving by the driver by extending the degradation time.

In another preferable mode, as illustrated in FIG. 15, as a degree of the intervention by the driver of the vehicle in steering operation (for example, the steering torque value) increases, based on the intervention by the driver in steering operation, the control unit shortens time (Ts) for transition from automated driving control for causing the vehicle to travel autonomously to manual driving allowing the driver to drive the vehicle.

With the above configuration, when the intervention by the driver is large, the driver's intent can be prioritized, and automated driving can be quickly switched to manual driving by shortening the degradation time.

In another preferable mode, as illustrated in FIG. 16, as dependence on automated driving control for causing the vehicle to travel autonomously drops, based on the intervention by the driver in steering operation, the control unit shortens time (Ts) for transition from automated driving control for causing the vehicle to travel autonomously to manual driving allowing the driver to drive the vehicle.

With the above configuration, when the dependence on the system is low, automated driving can be quickly switched to manual driving by the driver by shortening the degradation time.

In another preferable mode, as illustrated in FIGS. 4 and 5, a vehicle motion control method for acquiring control commands for controlling a steering apparatus and a brake apparatus that are provided in a vehicle includes: acquiring, based on information about a target traveling path on which the vehicle travels, the information having been acquired by an external information acquisition unit, a normative motion state amount (a course-derived normative yaw rate) necessary for the vehicle to trace the target traveling path, acquiring a target motion state amount (a behavior stabilization moment (ESC (VDC) during AD)) necessary for generating a yaw moment to cancel unstable behavior of the vehicle, based on the normative motion state amount and a motion state amount (a lateral G, a yaw rate) of the vehicle acquired from a vehicle motion state detection unit mounted in the vehicle; acquiring a target steering angle for generating a steering angle moment and a target brake force for generating a brake moment, to obtain a necessary yaw moment generated by the vehicle, based on the information about the target traveling path and the target motion state amount; performing balancing and allocation; outputting a first control command (a steering angle) for obtaining the target steering angle to the steering apparatus; and outputting a second control command (a brake moment) for obtaining the target brake force to the brake apparatus.

In accordance with the above method, the traveling location and the stabilization moment are balanced, and control amounts are allocated to the steering angle and brakes. Thus, both course traceability and behavior stability can be achieved during automated driving.

In another preferable mode, as illustrated in FIGS. 4 and 5, a vehicle motion control system includes: a steering apparatus which is provided in a vehicle; a brake apparatus which is provided in the vehicle; an external information acquisition apparatus which acquires external information about the vehicle; a vehicle motion state detection apparatus which acquires a motion state amount (a lateral G, a yaw rate) of the vehicle; and a controller. The controller acquires, based on information about a target traveling path on which the vehicle travels, the information having been acquired by the external information acquisition apparatus, a normative motion state amount (a course-derived normative yaw rate) necessary for the vehicle to trace the target traveling path, acquires a target motion state amount (a behavior stabilization moment (ESC (VDC) during automated driving)) necessary for generating a yaw moment to cancel unstable behavior of the vehicle, based on the normative motion state amount and the motion state amount (a lateral G, a yaw rate) of the vehicle acquired from the vehicle motion state detection apparatus, acquires a target steering angle for generating a steering angle moment and a target brake force for generating a brake moment, to obtain a necessary yaw moment generated by the vehicle, based on the information about the target traveling path and the target motion state amount, performs balancing and allocation, outputs a first control command (a steering angle) for obtaining the target steering angle to the steering apparatus, and outputs a second control command (a brake moment) for obtaining the target brake force to the brake apparatus.

With the above configuration, the traveling location and the stabilization moment are balanced, and the control amounts are allocated to the steering angle and brakes. Thus, both course traceability and behavior stability can be achieved more reliably during automated driving.

The configurations in the above examples have been schematically described to an extent that the present invention can be understood and carried out. Thus, the present invention is not limited to the above-described examples and may be modified in various modes without departing from the scope of the technical concept as claimed in the claims.

REFERENCE SYMBOL LIST 1 vehicle
2L, 2R, 3L, 3R wheel
4L, 4R, 5L, 5R wheel cylinder (brake apparatus)
6 wheel cylinder fluid pressure control apparatus
7 vehicle information acquisition apparatus
8 electric power steering apparatus (steering apparatus)
9 steering wheel
10 external information acquisition apparatus
11 control apparatus (control unit)
11-1 target track calculation unit
11-2 target control amount calculation unit
11-3 target steering angle calculation unit
11-4 steering control unit
11-5 behavior-stabilization target state amount calculation unit
11-6 behavior-stabilization moment calculation unit
11-7 target yaw moment calculation unit
11-8 generated moment estimation unit
11-9 target brake moment calculation unit
11-10 target brake fluid pressure calculation unit
11-11 road surface μ estimation unit
12-1 steering-angle-based behavior-stabilization target state amount calculation unit 12-2 target-track-based behavior-stabilization target state amount calculation unit
12-3 behavior-stabilization target state amount selection unit
13-1 target steering angle correction unit
13-2 target control amount correction unit
15-1 steering-angle-based behavior-stabilization moment calculation unit
15-2 target-track-based behavior-stabilization moment calculation unit
15-3 target yaw moment balancing unit
15-4 override-time control correction unit

The invention claimed is:

1. A vehicle motion control apparatus comprising:
a control unit which controls a steering apparatus and a brake apparatus that are provided in a vehicle having front wheels,
wherein the control unit
acquires, based on information about a target traveling path on which the vehicle travels, a normative motion state amount necessary for the vehicle to trace the target traveling path, wherein the information about the target traveling path is acquired by an external information acquisition unit,
acquires a target motion state amount necessary for generating a yaw moment to cancel unstable behavior of the vehicle, based on the normative motion state amount and a motion state amount of the vehicle acquired from a vehicle motion state detection unit mounted in the vehicle,
acquires a target steering angle for generating a steering angle moment and a target brake force for generating a brake moment, to obtain a necessary yaw moment generated by the vehicle, based on the information about the target traveling path and the target motion state amount,
outputs a first control command for obtaining the target steering angle to the steering apparatus, and
outputs a second control command for obtaining the target brake force to the brake apparatus,
controls a brake force of each individual wheel of the vehicle based on the first control command, and
performs automated steering of the front wheels of the vehicle based on the second control command.

2. The vehicle motion control apparatus according to claim 1, wherein the control unit acquires the target steering angle and the target brake force such that the brake moment compensates for deficiency in a yaw moment generated by the steering angle moment in the necessary yaw moment.

3. The vehicle motion control apparatus according to claim 2, wherein the control unit acquires the target steering angle and the target brake force such that a ratio of the yaw moment generated by the steering angle moment drops and a ratio of the yaw moment generated by the brake moment increases as risk of a spin of the vehicle based on the motion state amount of the vehicle increases.

4. The vehicle motion control apparatus according to claim 2, wherein the control unit acquires the target steering angle and the target brake force such that a ratio of the yaw moment generated by the steering angle moment drops and a ratio of the yaw moment generated by the brake moment increases as dependence on automated driving control for causing the vehicle to travel autonomously drops.

5. The vehicle motion control apparatus according to claim 1, wherein the control unit acquires the target steering angle and the target brake force such that a ratio of a yaw moment generated by the steering angle moment drops and a ratio of a yaw moment generated by the brake moment increases when a driver of the vehicle intervenes in steering operation.

6. The vehicle motion control apparatus according to claim 5, wherein, as risk of a spin of the vehicle based on the motion state amount of the vehicle increases, based on intervention by the driver of the vehicle in steering operation, the control unit shortens time for transition from automated driving control for causing the vehicle to travel autonomously to manual driving allowing the driver of the vehicle to drive the vehicle.

7. The vehicle motion control apparatus according to claim 5, wherein, as risk of the vehicle going off the target traveling path increases, based on intervention by the driver of the vehicle in steering operation, the control unit extends time for transition from automated driving control for causing the vehicle to travel autonomously to manual driving allowing the driver of the vehicle to drive the vehicle.

8. The vehicle motion control apparatus according to claim 5, wherein, as a degree of intervention by the driver of the vehicle in steering operation increases, based on intervention by the driver in steering operation, the control unit shortens time for transition from automated driving control for causing the vehicle to travel autonomously to manual driving allowing the driver to drive the vehicle.

9. The vehicle motion control apparatus according to claim 5, wherein, as dependence on automated driving control for causing the vehicle to travel autonomously drops, based on intervention by the driver in steering operation, the control unit shortens time for transition from automated driving control for causing the vehicle to travel autonomously to manual driving allowing the driver to drive the vehicle.

10. A vehicle motion control method for obtaining control commands for controlling a steering apparatus and a brake apparatus that are provided in a vehicle having front wheels, the vehicle motion control method comprising:
acquiring, based on information about a target traveling path on which the vehicle travels, a normative motion state amount necessary for the vehicle to trace the target traveling path; wherein the information about the target traveling path is acquired by an external information acquisition unit,
acquiring a target motion state amount necessary for generating a yaw moment to cancel unstable behavior of the vehicle, based on the normative motion state amount and a motion state amount of the vehicle acquired from a vehicle motion state detection unit mounted in the vehicle;
acquiring a target steering angle for generating a steering angle moment and a target brake force for generating a brake moment, to obtain a necessary yaw moment generated by the vehicle, based on the information about the target traveling path and the target motion state amount;
outputting a first control command for obtaining the target steering angle to the steering apparatus;
outputting a second control command for obtaining the target brake force to the brake apparatus;
controlling a brake force of each individual wheel of the vehicle based on the first control command; and
performing automated steering of the front wheels of the vehicle based on the second control command.

11. A vehicle motion control system comprising:
a steering apparatus which is provided in a vehicle having front wheels;
a brake apparatus which is provided in the vehicle;
an external information acquisition apparatus which acquires external information about the vehicle; and
a control unit,
wherein the control unit;
acquires a motion state amount of the vehicle;
acquires, based on information about a target traveling path on which the vehicle travels, a normative motion state amount necessary for the vehicle to trace the target traveling path, wherein the information about the target traveling path is acquired by an external information acquisition unit,
acquires a target motion state amount necessary for generating a yaw moment to cancel unstable behavior of the vehicle, based on the normative motion state amount and the motion state amount of the vehicle acquired from the control unit,
acquires a target steering angle for generating a steering angle moment and a target brake force for generating a brake moment, to obtain a necessary yaw moment generated by the vehicle, based on the information about the target traveling path and the target motion state amount,
outputs a first control command for obtaining the target steering angle to the steering apparatus,
outputs a second control command for obtaining the target brake force to the brake apparatus,
controls a brake force of each individual wheel of the vehicle based on the first control command, and
performs automated steering of the front wheels of the vehicle based on the second control command.

* * * * *